US010649307B2

(12) United States Patent
Vernon et al.

(10) Patent No.: US 10,649,307 B2
(45) Date of Patent: May 12, 2020

(54) INTEGRATED DEVICES FOR SQUEEZED LIGHT GENERATION (71) Applicant: Xanadu Quantum Technologies Inc., Toronto, CA (US)

(72) Inventors: Zachary Vernon, Toronto (CA); Kang Tan, Toronto (CA); Blair Morrison, Toronto (CA); Reihaneh Shahrokhshahi, Toronto (CA); Dylan Mahler, Toronto (CA); Matteo Menotti, Toronto (CA); Nicolas Quesada, Toronto (CA)

(73) Assignee: Xanadu Quantum Technologies Inc., Toronto, ON (CA)

( * ) Notice: Subject to any disclaimer, the term of this patent is extended or adjusted under 35 U.S.C. 154(b) by 0 days.

(21) Appl. No.: 16/400,343

(22) Filed: May 1, 2019

(65) Prior Publication Data
US 2019/0339587 A1  Nov. 7, 2019

Related U.S. Application Data (60) Provisional application No. 62/665,147, filed on May 1, 2018.

(51) Int. Cl.
*G02F 1/365* (2006.01)
*G02F 1/355* (2006.01)
*G02F 1/35* (2006.01)

(52) U.S. Cl.
CPC ............ *G02F 1/365* (2013.01); *G02F 1/3536* (2013.01); *G02F 1/3556* (2013.01); *G02F 2001/354* (2013.01)

(58) Field of Classification Search
CPC ...... G02F 1/3536; G02F 1/3556; G02F 1/365; G02F 2001/354
See application file for complete search history.

(56) References Cited

U.S. PATENT DOCUMENTS

| 6,865,317 | B2 * | 3/2005 | Vahala | ............... | B23K 26/0823 |
| | | | | | 385/30 |
| 7,453,626 | B2 * | 11/2008 | Lett | ........................ | G02F 1/3536 |
| | | | | | 359/326 |

(Continued)

OTHER PUBLICATIONS

International Search Report and Written Opinion dated Jul. 11, 2019 for International Application No. PCT/CA2019/050566, 8 pages.

(Continued)

*Primary Examiner* — Daniel Petkovsek
(74) *Attorney, Agent, or Firm* — Cooley LLP (57) ABSTRACT

An apparatus includes an optical medium characterized by a third-order nonlinear optical susceptibility. The apparatus also includes a pump light source in optical communication with the optical medium and configured to send a pump light beam to the optical medium. The pump light beam includes a pulsed light beam. The apparatus also includes a drive light source in optical communication with the optical medium and configured to send a drive light beam to the optical medium. The drive light beam includes a continuous wave (CW) light beam. The pump light beam and the drive light beam are configured to generate a signal light beam in a squeezed state of light via spontaneous four-wave mixing in the optical medium.

20 Claims, 8 Drawing Sheets

(56) References Cited

U.S. PATENT DOCUMENTS

| | | | | |
|---|---|---|---|---|
| 9,625,320 | B2* | 4/2017 | Chitgarha | G01J 3/45 |
| 10,175,556 | B2* | 1/2019 | Reimer | B82Y 10/00 |
| 2006/0285197 | A1* | 12/2006 | McKinstrie | H01S 3/06758 |
| | | | | 359/333 |
| 2007/0230518 | A1* | 10/2007 | Watanabe | H04B 10/299 |
| | | | | 372/22 |
| 2010/0021105 | A1* | 1/2010 | Watanabe | G02F 1/395 |
| | | | | 385/11 |
| 2019/0056632 | A1* | 2/2019 | Dutt | G02F 1/365 |

OTHER PUBLICATIONS

Bajoni, D. & Galli, M., "Nonclassical light sources for silicon photonics," Photonics and Nanostructures—Fundamentals and Applications, 26:24-34 (2017).

Garcia-Ferrer, F. V. et al., "Squeezing Via Spontaneous Rotational Symmetry Breaking in a Four-Wave Mixing Cavity," IEEE Journal of Quantum Electronics, 45(11):1404-1414 (2009).

Langford, N. K. et al., "Efficient quantum computing using coherent photon conversion," Nature, 478:360-363 (2011).

Silverstone, J. W. et al., "Silicon Quantum Photonics," IEEE Journal of Selected Topics in Quantum Electronics, 22(6), 6700113 (2016), 13 pages; doi:10.1109/JSTQE.2016.2573218.

Vernon, Z. et al., "Scalable squeezed light source for continuous variable quantum sampling," arXiv:1807.000044.v1 [quant-ph] Jun. 29, 2018, 9 pages.

\* cited by examiner

INTEGRATED DEVICES FOR SQUEEZED LIGHT GENERATION

CROSS-REFERENCE TO RELATED APPLICATION

This application claims priority to U.S. Patent Application No. 62/665,147, filed May 1, 2018, and entitled "INTEGRATED DEVICES FOR SQUEEZED LIGHT GENERATION", the disclosure of which is incorporated herein by reference in its entirety.

FIELD

One or more embodiments relate to generation of squeezed light via nonlinear optical process.

BACKGROUND

Squeezed light (also referred to light in a squeezed state) refers to light in which the electric field strength for some phases has a quantum uncertainty (also referred to as noise) smaller than that of a coherent state. A wide range of applications can benefit from high quality sources of squeezed light. For example, in metrology, using squeezed light allows certain optical sensors to overcome the shot noise limit and achieve sensitivities many times higher than possible with conventional light sources. In quantum communications, squeezed light can be used to distribute entanglement, thereby assisting cryptographic key distribution protocols. Squeezed light sources can also be used to deterministically generate massive highly entangled quantum states, enabling the construction of scalable quantum simulation and computation devices operating in the optical domain using a continuous variable (CV) encoding.

To fully exploit the potential of squeezed light in above applications, it is desirable for the squeezed light source to be scalable, tunable, compatible with existing optical technology including single photon detection, and capable of generating controllable temporal mode structures in the output. To date, however, no known squeezed light source can achieve all these goals at the same time. For example, squeezed light sources based on parametric down-conversion in bulk non-centrosymmetric crystals are compatible with single photon detection, but it is challenging to control the temporal mode structure of their output. In addition, this method is not scalable because it relies on bulk optical elements that are difficult to stabilize. Squeezed light sources based on the Kerr effect in nonlinear fiber are compatible with 1550 nm operation. But it is incompatible with single photon detection and usually produces a very complex temporal mode structure.

SUMMARY

Some embodiments described herein relate generally to generation of squeezed light via four-wave mixing, and, in particular, to generation of squeezed light using a strong continuous wave (CW) drive light beam and a pulsed pump beam via four-wave mixing. In some embodiments, an apparatus includes an optical medium characterized by a third-order nonlinear optical susceptibility. The apparatus also includes a pump light source in optical communication with the optical medium and configured to send a pump light beam to the optical medium. The pump light beam includes a pulsed light beam. The apparatus also includes a drive light source in optical communication with the optical medium and configured to send a drive light beam to the optical medium. The drive light beam includes a continuous wave (CW) light beam. The pump light beam and the drive light beam are configured to generate a signal light beam in a squeezed state of light via spontaneous four-wave mixing in the optical medium.

In some embodiments, a method includes sending a pump light beam into an optical medium characterized by a third-order nonlinear optical susceptibility. The pump light beam includes a pulsed light beam. The method also includes sending a drive light beam into the optical medium so as to generate a signal light beam at a squeezed state of light via spontaneous four-wave mixing in the optical medium. The drive light beam includes a continuous wave (CW) light beam.

In some embodiments, a system includes a ring resonator including an optical medium characterized by a third-order nonlinear optical susceptibility. The system also includes a linear waveguide in optical communication with the ring resonator and configured to propagate a pump light beam and a drive light beam. A first coupler is in optical communication with the ring resonator and the linear waveguide. The first coupler is configured to couple the pump light beam and the drive light beam into the ring resonator. The drive light beam and pump light beam are configured to reduce an effect of time-varying self-phase modulation and an effect of time-varying cross-phase modulation. The pump light beam and the drive light beam are further configured to generate a signal light beam in a squeezed light of state via four-wave mixing. The system also includes a second coupler in optical communication with the ring resonator and configured to suppress auxiliary resonances within the ring resonator.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

In some embodiments, an apparatus includes an optical medium characterized by a third-order nonlinear optical susceptibility. The apparatus also includes a pump light source in optical communication with the optical medium and configured to send a pump light beam to the optical medium. The pump light beam includes a pulsed light beam. A drive light source is in optical communication with the optical medium and configured to send a drive light beam to the optical medium. The drive light beam includes a continuous wave (CW) light beam. The pump light beam and the drive light beam are configured to generate a signal light beam in a squeezed state of light (also referred to as squeezed light) via spontaneous four-wave mixing in the optical medium.

During the interaction of the drive light beam and the pump light beam within the optical medium, time varying cross phase modulation (also referred to as dynamic cross phase modulation) may also occur and may adversely affect the generation of the squeezed light. For example, cross phase modulation can corrupt the resonance enhancement of the four-wave mixing process that generates the squeezed light, thereby decreasing the efficiency. In particular, the time varying cross phase modulation can change the temporal profile of the mode in which the squeezed light is generated and lead to unreliable device operation.

Such adverse effect, however, can be addressed by the mode and relative power (or intensity) of the drive beam and pump beam. More specifically, the drive light beam is CW and sufficiently powerful such that the cross phase modulation effect induced by the drive beam (i.e., static cross phase modulation) dominates over the cross phase modulation induced by the pulsed pump beam (i.e., the dynamic cross phase modulation). As a result, the drive light beam and the pump light beam can efficiently generate the squeezed light while suppressing the negative effect of dynamic cross phase modulation to a tolerable level.

In some embodiments, the power of the pump light beam can be about 10% or less than the power of the drive light beam (e.g., about 10%, about 9%, about 8%, about 7%, about 6%, about 5%, or less, including any values and sub ranges in between).

In some embodiments, the optical medium includes silicon nitride, which is widely used in optical communications (e.g., as waveguides). Therefore, the resulting apparatus for squeezed light generation can be highly compatible with existing optical technologies. In some embodiments, the optical medium can include any other material that has a strong third order susceptibility, such as silicon, silica, lithium niobate, and aluminum nitride, among others.

In some embodiments, the optical medium can be configured as a ring resonator to increase the interaction strength between the drive light beam and the pump light beam. In these embodiments, the apparatus also includes a Mach-Zehnder interferometer (MZI) in optical communication with the ring resonator and configured to couple the pump light beam and the drive light beam into the ring resonator. The MZI coupler also allows independent control of the coupling between the drive/pump light beam and the ring resonator. For example, the MZI can achieve over-coupling for the one light beam and under-coupling for the other light beam. In some embodiments, the drive light beam and the pump light beam can be coupled into the ring resonator via any other appropriate type of couplers, such as a directional coupler, a racetrack coupler, a point coupler, or a pulley coupler.

In some embodiments, the apparatus also includes an auxiliary coupler in optical communication with the ring resonator and configured to suppress auxiliary resonance within the ring resonator. As used herein, auxiliary resonance refers to resonances other than the four-wave mixing process that generates the squeezed light. The auxiliary coupler can be configured to efficiently couple out light signals generated by the auxiliary resonance so as to prevent the build-up of resonance. In some embodiments, the auxiliary coupler includes a ring resonator (also referred to as an auxiliary ring resonator). In some embodiments, the quality factor of the auxiliary ring resonator can be less than the quality factor of the ring resonator where the squeezed light is generated.

Figure 1:
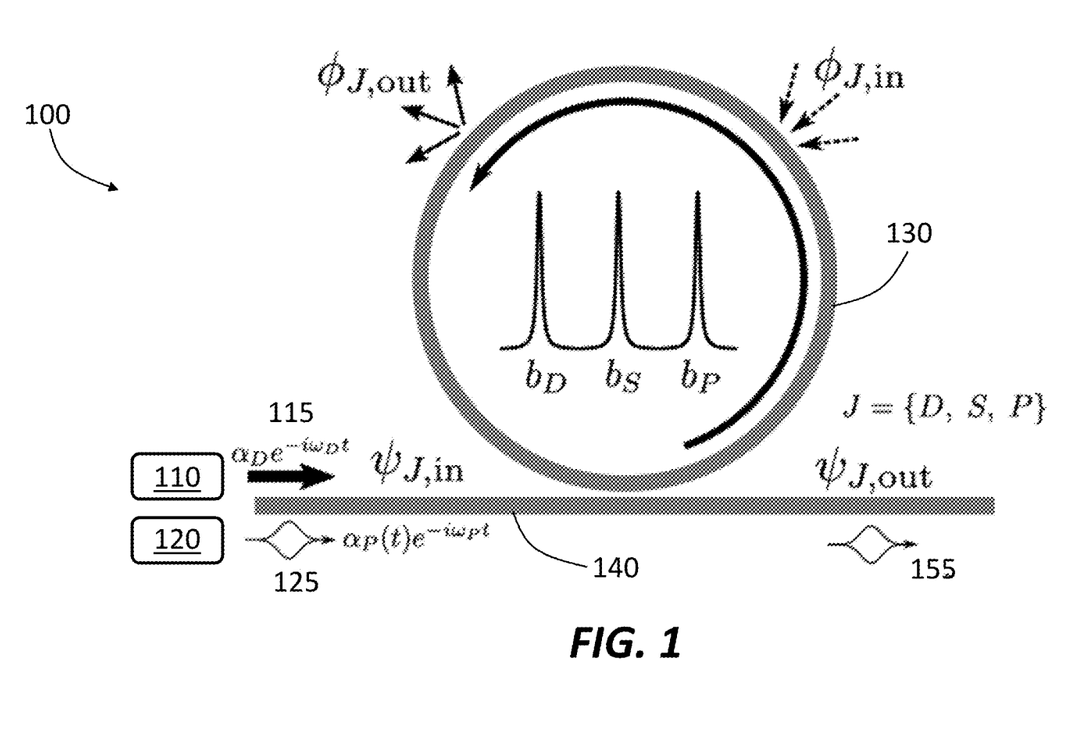
FIG. 1 shows a schematic of an apparatus for generating squeezed light via four-wave mixing, according to an embodiment.

FIG. 1 shows a schematic of an apparatus 100 for generating squeezed light via four wave mixing, according to an embodiment. The apparatus 100 includes an optical medium 130 characterized by a third-order nonlinear optical susceptibility. A drive light source 110 is in optical communication with the optical medium 130 and configured to send a drive light beam 115 to the optical medium 130 (e.g., via a waveguide 140, also referred to as a side channel 140). The drive light beam 115 includes a continuous wave (CW) light beam. A pump light source 120 is in optical communication with the optical medium 130 and configured to send a pump light beam 125 to the optical medium 130. The pump light beam 125 includes a pulsed light beam. The pump light beam 125 and the drive light beam 115 are configured to generate a signal light beam in a squeezed state of light via spontaneous four-wave mixing in the optical medium 130.

In some embodiments, the apparatus 100 can be constructed on an integrated nanophotonic platform. For example, the drive light source 110 (e.g., a CW semiconductor laser), the pump light source 120 (e.g., a pulsed semiconductor laser), the optical medium 130 (e.g., a ring resonator), and the waveguide 140 can be fabricated on the same semiconductor substrate, thereby forming an integrated squeezed light source. In some implementations, the optical medium 130 and the waveguide 140 can include silicon nitride surrounded by silicon dioxide. Quality factors of micro-resonators in such platforms can readily exceed one million, in conjunction with small mode volumes and high transverse confinement providing nonlinear parameters in excess of 1 $(Wm)^{-1}$ and dramatic enhancement of parametric fluorescence processes.

In these implementations, approximately 100 mW of drive power from the drive light beam 115 can be coupled to the optical medium 130. Combined with a suitable technique of suppressing unwanted resonances, such as an auxiliary stacked resonator system, only a few mW or less of pulsed pump power from the pump light beam 125 can produce squeezed light having a squeezing factor of several dB. The generated squeezed state can be engineered to have single-temporal-mode nature by over-coupling the pulsed pump resonance (i.e., over-coupling between the pump light beam 125 and the optical medium 130) via a coupler based on Mach-Zehnder interferometer (MZI) and driving the four-wave mixing with a short pulse duration, without seriously compromising the efficiency. More modest over-coupling of the signal resonance (i.e., over-coupling between the signal light beam 155 and the optical medium 130) can mitigate losses, thereby allowing nearly pure states to be generated. As used herein, pure states here refers to quantum mechanical states that are not entangled with other degrees of freedom (e.g., scattering modes).

In some embodiments, the apparatus 100 can be constructed with bulk and fiber-based optical elements. For example, the optical medium 130 can be included in a fiber and the linear waveguide 140 can include another fiber. In addition, the first and second light sources 110 and 120 can be coupled to the linear waveguide 140 via one or more fiber couplers.

In some embodiments, the drive light source 110 and/or the pump light source 120 can include semiconductor lasers. In these embodiments, the optical medium 130, the waveguide 140 and the two light sources 110 and 120 can be fabricated on the same semiconductor substrate to form an integrated squeezed light source (also referred to as a monolithic light source). In some embodiments, the drive light source 110 and/or the pump light source 120 can include lasers, light emitting diodes (LEDs), or any other appropriate type of light source.

In some embodiments, the power of the drive light beam 115 can be ten times or greater than the power of the pump light beam 125 (e.g., about 10 times, about 20 times, about 30 times, or greater, including any values and sub ranges in between). In some embodiments, the optical medium 130 includes silicon nitride, and the power of the drive light beam 115 can be about 20 mW or greater (e.g., about 20 mW, about 50 mW, about 100 mW, about 200 mW, about 300 mW, about 500 mW, or greater, including any values and sub ranges in between).

In some embodiments, the drive light source 110 and/or the pump light source 120 are tunable so as to control the properties of the signal light beam 155. The magnitude and angle of the squeezing parameters can be determined by the product of the amplitudes of the drive light beam 115 and the pump light beam 125. Accordingly, the magnitude and angle of the squeezing can be controlled by modulating one or both of the input beams 115 and 125. In addition, the squeezing angle can be locked to the sum phase of the drive light beam 115 and the pump light beam 125. Furthermore, the squeezing factor can be controlled by the product of the powers of the two input beams 115 and 125. The squeezed output can therefore be calibrated against and controlled by the input powers and phases.

In some implementations, the output frequency of the drive light source 110 and/or the pump light source 120 can be tunable so as to change the squeezing factor of the signal light beam 155. In some implementations, the power of the drive light source 110 and/or the pump light source 120 can be tunable so as to change the squeezing factor of the signal light beam 155. In some implementations, the relative phase between the drive light source 110 and the pump light source 120 can be tunable so as to change the phase of the signal light beam 155.

In some embodiments, the optical medium 130 includes appropriate material that has a strong third order susceptibility, such as silicon nitride, silicon, silica, lithium niobate, and aluminum nitride, among others. In some embodiments, the optical medium 130 can be compatible with existing optical technologies and semiconductor fabrications processes such that the apparatus 100 can be readily constructed on a mass scale.

The optical medium 130 can be configured, for example, as a resonator. In some implementations, the resonator can be a linear resonator including two reflectors surrounding an optical material. In some implementations, the optical medium 130 can be configured as a ring resonator (as illustrated in FIG. 1). In these implementations, the apparatus 100 can further include a coupler between the waveguide 140 and the ring resonator 130 to facilitate the coupling of the drive/pump light beams 115/125 into the ring resonator. The coupler can include, for example, Mach-Zehnder interferometer (MZI) coupler, direct coupler, racetrack coupler, point coupler, pulley coupler, or any other appropriate coupler.

As described herein, the apparatus 100 has several advantages compared to known squeezed light sources. First, the apparatus 100 uses the third-order nonlinear optical response of the optical medium 130, making it compatible with many commonly used nanophotonic platforms, such as silicon nitride.

Second, the apparatus 100 has relatively modest requirements for fabrication and high design tolerances. As a result, the apparatus 100 is highly scalable, i.e., multiple light sources identical to the apparatus 100 can be readily reproduced. In addition, multiple light sources like the apparatus 100 can be configured into an array to form a light source array. For example, the multiple apparatus 100 can be fabricated on a single semiconductor substrate. This configuration can be especially beneficial to applications in quantum technologies, where multiple identical squeezed light sources are used for input.

Third, the materials of the apparatus 100 also makes it compatible with existing optical technology. For example, the apparatus 100 can be based on silicon nitride and operate at wavelengths compatible with existing technology and infrastructure, such as the telecom C band around 1550 nm.

Fourth, the mechanism of squeezing underlying the apparatus 100 is naturally suited to engineering highly tunable devices with controllable temporal mode structure. More specifically, the wavelengths of the drive light beam 115 and the pump light beam 125 can be readily tunable. In addition, removal of unwanted pump light and suppression of unwanted spurious light can also be readily achieved (e.g., via couplers, see FIG. 4 below). The resulting squeezed light source is therefore ideally suited for CV quantum simulation and computing applications.

In some embodiments, the optical medium 130 can be configured as a ring resonator (as illustrated in FIG. 1), which can increase the efficiency of generating squeezed light. In some implementations, the ring resonator 130 can include a micro-resonator fabricated on a semiconductor platform (e.g., silicon nitride). The ring resonator 130 can be side-coupled to the waveguide 140, which can also be fabricated on the same semiconductor platform.

The ring resonator 130 can accommodate a number of resonant optical modes J, each of which is assigned a quantum-mechanical annihilation operators $b_J$. More specifically, $b_D$ represents the resonant optical mode of the drive light beam 115, $b_P$ represents the resonant optical mode of the pump light beam 125, and $b_S$ represents the resonant optical mode of the signal light beam 155.

The third-order nonlinear optical response of the resonator material leads to an interaction Hamiltonian (representing the energy of the four-wave system) that contains a number of terms. Without being bound by any particular theory or mode of operation, the interaction Hamiltonian can be written as:

$$H_{NL} = -\hbar \Lambda \left( b_S b_S b_D^\dagger b_P^\dagger + H.c. \right) - \qquad (1)$$

-continued $$\frac{\hbar\Lambda}{2}\sum_{J=D,S,P} b_J^\dagger b_J^\dagger b_J b_J - 2\hbar\Lambda\left(b_D^\dagger b_D(b_S^\dagger b_S + b_P^\dagger b_P) + b_P^\dagger b_P b_S^\dagger b_S\right)$$

where the term H.c. is Hermitian conjugate, the coefficient $\Lambda$ is related to the micro-resonator structure and the strength of the third-order optical nonlinearity of the optical medium 130, and $\hbar$ is reduced Planck constant. For a ring resonator 130, the coefficient $\Lambda$ can be written as $\Lambda \approx \hbar \omega_s v_g^2 \gamma_{NL}/2L$, where $\omega_s$ is the frequency of the signal light beam 155, $v_g$ the group velocity, L the resonator length, and $\gamma_{NL}$ the waveguide nonlinear parameter.

In the ring resonator 130, three optical modes are of interest here, i.e., the drive mode D, the signal mode S, and the pump mode P, with corresponding optical angular frequencies $\omega_D$, $\omega_S$, and $\omega_P$. These resonances may not be evenly spaced in their intrinsic configuration (e.g., due to material and modal dispersion). In Equation (1), the first line corresponds to degenerate spontaneous four-wave mixing between the three modes, the second line corresponds to self-phase modulation, and the third line corresponds to cross-phase modulation.

Figure 2:
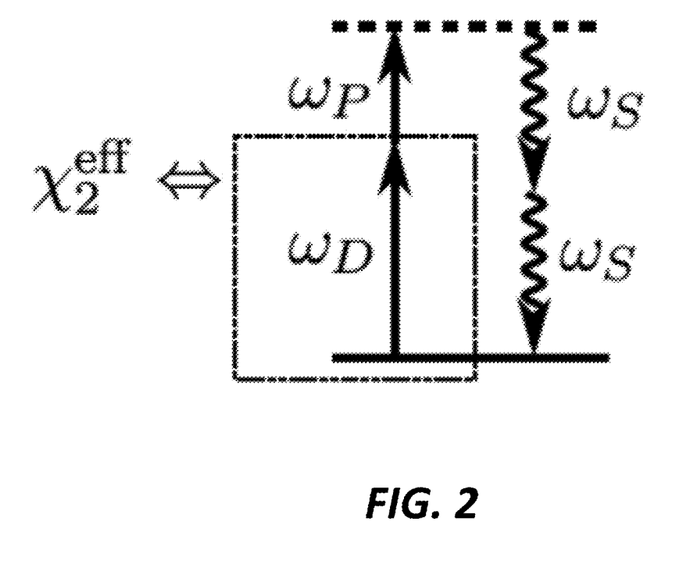
FIG. 2 shows a virtual level diagram of the dual-pumped spontaneous four-wave mixing for generating squeezed light, according to an embodiment.

FIG. 2 shows a virtual level diagram of the dual-pumped spontaneous four-wave mixing for generating squeezed light, according to an embodiment. In the presence of this effective second-order nonlinearity, a weaker coherent pump pulse in the P mode thereby produces photon pairs via parametric fluorescence into the S mode. Using a strong CW pump in conjunction with the intrinsic $\chi_3$ response can mediate an effective $\chi_2$ interaction (labelled as $\chi_2^{eff}$ in FIG. 2) in an integrated resonator. In some embodiments, this configuration can be implemented on a silicon nitride nanophotonic platform.

Referring back to FIG. 1, the ring resonator 130 is driven by two coherent optical beams (i.e., the drive light beam 115 and the pump light beam 125) propagating in the waveguide 140. The drive mode D can be supplied with strong CW light having a steady amplitude, with a fixed amplitude appropriate for a given device (e.g., taking into account the damage threshold of the device). The strong drive light beam 115 can lead to an effective detuning of each resonance frequency from self-phase modulation and cross-phase modulation driven by the large steady amplitude of light in the D mode. In Equation (1), all the frequencies $\omega_J$ represent the frequencies for steady operation after taking into account such detuning for steady operation.

The nonlinear detuning process can also be employed to counteract the effects of modal and material dispersion that give rise to unequally spaced resonances. For the four-wave mixing process to be phase-matched, it is beneficial for the resonant frequencies of the drive light beam 115 and the pump light beam 125 to be separated from the signal resonance by an equal number of mode orders. In addition, to maximize the efficiency of the squeeze light generation, it is also beneficial for the resonant frequencies of the three resonances to be close to evenly spaced. In the ring resonator 130, the strong normal dispersion can be offset by the cross-phase modulation induced by the strong CW drive light beam 115.

Figure 3A:
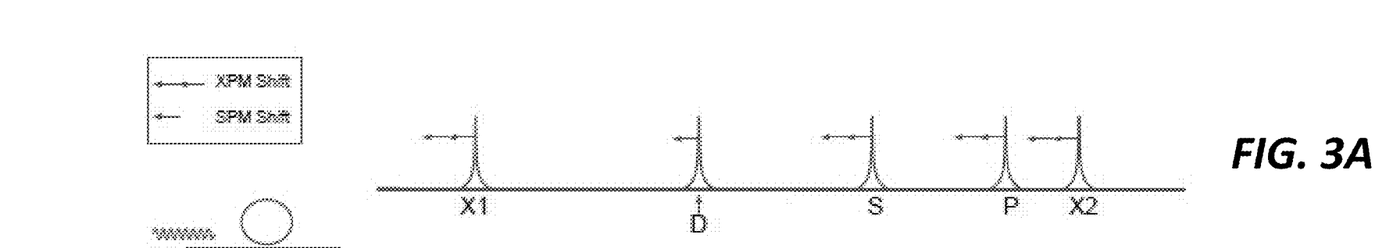
FIGS. 3A and 3B illustrate the tuning of a squeezed light source to counteract strong normal dispersion via cross-phase modulation driven by a strong continuous-wave (CW) beam, according to an embodiment.
Figure 3B:
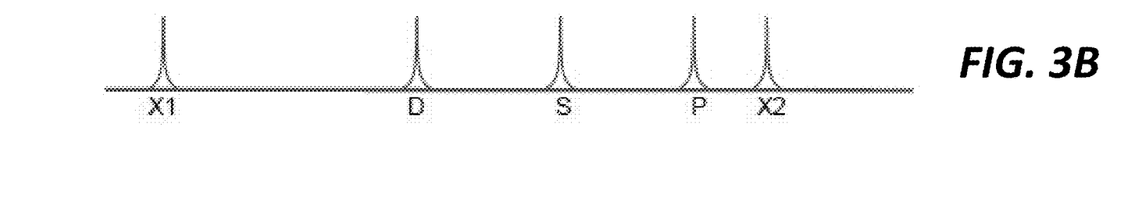

FIGS. 3A and 3B illustrate the tuning of the resonator to counteract strong normal dispersion via cross-phase modulation driven by a strong CW beam, according to an embodiment. The resonances in the un-driven "cold" cavity are unevenly spaced in the frequency domain due to modal and material dispersion as shown in FIG. 3A. To bring the desired parametric fluorescence process into resonance, a strong CW drive beam can be used to induce a nonlinear detuning via cross-phase modulation, pushing the D, S, and P resonances into an evenly spaced configuration in frequency, as seen in FIG. 3B. At the same time, the detuning also simultaneously pushes unwanted resonances X1 and X2 to frequency ranges that are further detuned from spurious spontaneous four-wave mixing, thereby suppressing unwanted photon generation in the signal resonance. This is made possible by the strength of the cross-phase modulation (XPM)-induced frequency shift, which is twice that of the self-phase modulation (SPM)-induced shift.

The pump mode P is driven by a sufficiently weak pump light beam 125, which only induces negligible self-phase modulation and cross-phase modulation. The signal mode S carries the generated squeezed light of interest, and therefore usually does not have an appreciable effect on any mode due to cross-phase modulation. For the same reason, self-phase modulation within the S mode is also negligible, as is the back-action on the driven modes from the generation process. Accordingly, the interaction Hamiltonian in Equation (1) can be simplified as:

$$H_{NL} = -\hbar\Lambda(\beta_D^*\beta_P^*(t)b_Sb_S + \text{H.c.}) \qquad (2)$$

where $\beta_D$ and $\beta_P(t)$ are the classical mode amplitudes of the drive mode and the pump mode, respectively, in the resonator. This Hamiltonian is known to lead to a squeezed state of the signal S mode within the resonator via parametric fluorescence. This mode is coupled to the channel field (i.e., optical field within the waveguide 140), producing a propagating squeezed light output. The nature of this output can be determined by a number of features related to the pumping scheme and device design as discussed below.

The temporal mode structure of the signal light beam 155 can be determined by the bandwidths of the signal and pulsed pump resonance and the temporal structure of the pulse amplitude $\beta_P(t)$ in the P resonance mode. In some embodiments, $\beta_P(t)$ is a constant (i.e., when both the drive light beam 115 and the pump light beam 125 are CW), and the CW squeezed light across the S resonance bandwidth includes quantum-correlated upper and lower frequency sidebands, i.e., highly multi-mode squeezed light. This signal light beam 155 can be useful for metrological applications that employ spectrally resolved sideband measurement.

In some embodiments, $\beta_P(t)$ is a pulsed waveform having pulse duration much shorter than the inverse bandwidth of the S resonance and flat phase structure. As used herein, a flat phase structure refers to a phase structure that has a fixed phase as a function of time, i.e., without chirp, frequency modulation, or other varying phase properties across the pulse envelope. In these embodiments, the signal light beam 155 includes a train of single-temporal-mode squeezed vacuum states, which can be beneficial, for example, for continuous variable (CV) quantum simulation or computation device.

To satisfy the condition that $\beta_P(t)$, the intra-resonator amplitude of the P mode, has sufficiently short duration compared to the inverse bandwidth of the S mode to produce single-temporal-mode squeezing, the bandwidth of the P mode resonance can be configured to accept such a short duration pulse. This can be accomplished in at least two techniques. In some embodiments, the apparatus 100 can include a Mach-Zehnder interferometer (MZI)-based coupler to the optical medium 130. In some embodiments, the apparatus 100 can include auxiliary couplers that selectively alter the quality factors of independent resonances. More details can be found below with reference to FIG. 4.

The optical medium 130 configured as a ring resonator as shown in FIG. 1 may accommodate hundreds or even thousands of resonances. Out of these resonances (also referred to as auxiliary resonances or unwanted resonances), at least two processes are relevant to the performance of the apparatus 100 in generating squeezed light. The first one gives rise to unwanted spontaneous four-wave mixing, leading to the generation of spurious photons in the S mode. The second one gives rise to Bragg-scattering four-wave mixing, leading to an additional source of loss on the squeezed state generated in the S mode. Suppression of these unwanted photons is therefore beneficial to yield a pure low-noise squeezed output.

The quality of the squeezed light output, in terms of contamination by unwanted spurious generated light and by excess anti-squeezing due to losses, can be optimized by several approaches. In some embodiments, the wavelengths of the drive light beam 115 and the pump light beam 125 can be sufficiently far from the S mode of the signal light beam 155 such that Raman and Brillouin scattering into that mode becomes negligible. In addition, the strongly driven mode D of the drive light beam 115 can be placed on the red-detuned side of the S mode to suppress the Stokes contribution from Raman effects.

In some embodiments, the signal light beam 155 can be over-coupled with the resonator 130 so as to mitigate intra-resonator losses that might degrade the achievable squeezing by mixing in vacuum fluctuations from scattering modes. On the other hand, however, it is not always desirable to over-couple the D and P resonances, as they are usually most efficiently driven at critical coupling. To address this trade-off, MZI-based couplers or racetrack couplers can be used to achieve independent control over the coupling conditions of different resonances.

In some embodiments, the unwanted photons can be suppressed using an auxiliary coupler. Generation of unwanted photons in the S mode via other spontaneous four-wave mixing from singly-pumped processes typically involves an auxiliary resonance other than the S, P or D modes. Such generation can thus be suppressed by constructing a device to corrupt the corresponding extra resonances involved, either by detuning them away from the energy-conserving condition, degrading their quality factors, or removing the unwanted resonance altogether.

Figure 4:
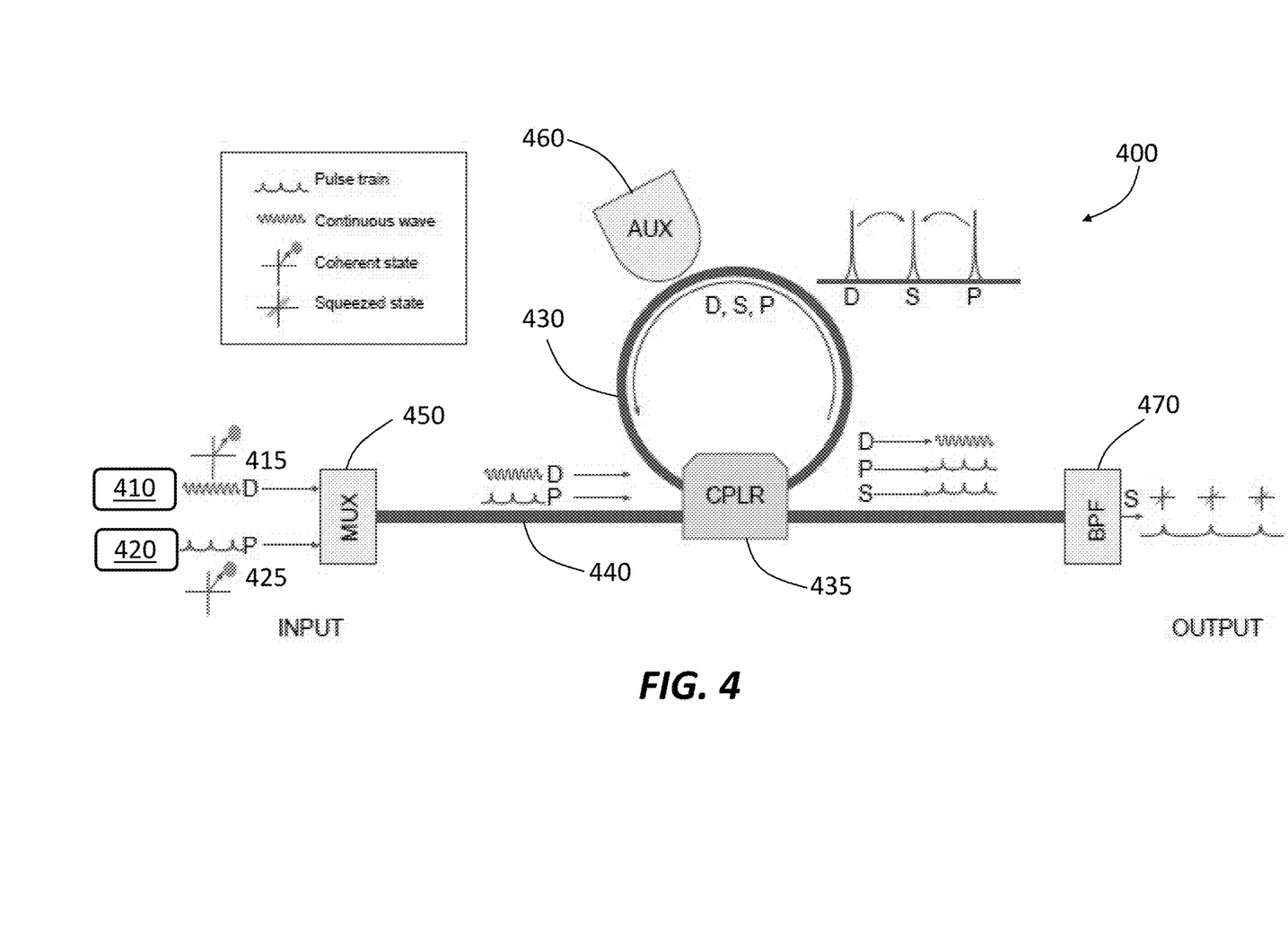
FIG. 4 shows a schematic of an apparatus including a main resonator and an auxiliary resonator for generating squeezed light via four-wave mixing, according to an embodiment.

FIG. 4 shows a schematic of an apparatus 400 including a main resonator 430 and an auxiliary resonator 460 for generating squeezed light via four-wave mixing, according to an embodiment. The apparatus 400 includes a drive light source 410 to provide a drive light beam 415 and a pump light source 420 to provide a pump light beam 425. The two beams 415 and 425 are combined by a mixing element (MUX) 450 into a waveguide 440, which is coupled to the main resonator 430 (also referred to as a principal resonator 430) via a coupler 435. In some embodiments, the coupler 435 includes a fixed coupler, such as a point coupler or a racetrack coupler. In some embodiments, the coupler 435 includes a tunable coupler, such as an MZI-based coupler.

The drive light beam 415 includes a strong CW drive beam having a wavelength corresponding to the resonance D within the main resonator 430. The pump light beam 425 includes a weak pulse train having a wavelength corresponding to the resonance P within the main resonator 430. Dual-pumped parametric fluorescence in the main resonator 430 induces a squeezed state in the S resonance, which has (after accounting for nonlinear detunings) a frequency equal to the average frequency of the D and P modes. This squeezed state yields a squeezed light output propagating in the waveguide 440.

A bandpass filter (BPF) 470 is employed to remove the unwanted pump beams. In some embodiments, the BPF 470 can be implemented interferometrically by coherent displacement or via passive wavelength filtering. Accordingly, the output of the apparatus 400 included only squeezed light, the temporal mode structure of which can be controlled by the pulse properties of the drive light beam 415 and the pump light beam 425.

Figure 5A:
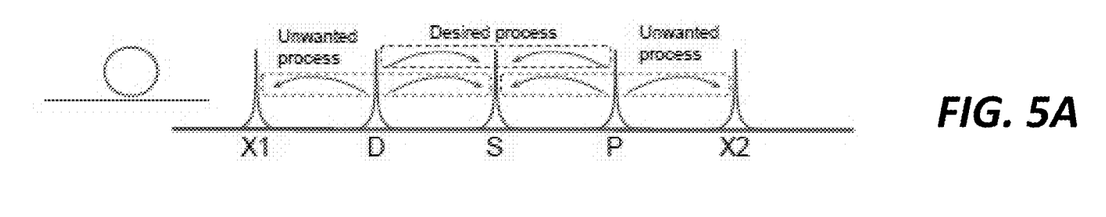
FIGS. 5A-5C illustrate the effects of the auxiliary resonator to suppress unwanted photon emission in the apparatus shown in FIG. 4, according to an embodiment.
Figure 5B:
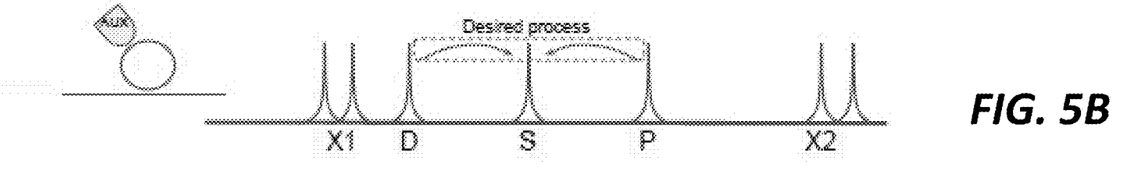
Figure 5C:
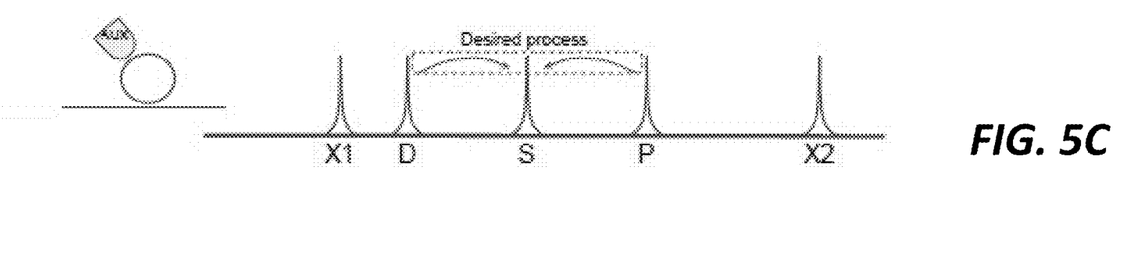

The apparatus 400 also includes the auxiliary resonator 460 to further tune the resonator 430 to suppress unwanted four-wave mixing processes by coupling to appropriate resonances and corrupting their ability to generate spurious light in the S mode (see, e.g., FIGS. 5A-5C). The auxiliary resonator 460 has a different free spectral range from the main resonator 430 and is employed to selectively split, detune, and degrade the quality factor of the extra resonance involved, thereby suppressing the unwanted process while preserving the desired squeezing interaction.

Alternatively or additionally, an MZI-based coupler to the main resonator 430 can provide some independent control over the quality factors of different resonances, thereby allowing the efficiencies of competing processes to be manipulated. A more complicated multi-resonator structure can also be used to provide full independent control over several sets of resonances.

FIGS. 5A-5C illustrates the effects of the auxiliary resonator to suppress unwanted photon emission in the apparatus 400 shown in FIG. 4, according to an embodiment. In general, the auxiliary resonator (or coupler) can suppress unwanted photon emission into the S mode by selectively manipulating the properties of auxiliary resonances involved in spurious nonlinear processes. FIG. 5A shows several example optical modes that can propagate in the ring resonator 430 without any auxiliary resonator. Two unwanted processes X1 and X2 contribute spurious photons to the S mode output.

FIG. 5B illustrates that the auxiliary resonator can suppress the X1 and X2 resonances by selectively splitting each of the X1 and X2 resonances. To this end, the auxiliary resonator has a free spectral range different from the spectral range of the main resonator (i.e., 430). In FIG. 5C, the auxiliary resonances X1 and X2 are independently shifted away. This can be accomplished by a multi-resonator system in which parametric fluorescence occurs in shared resonant modes.

FIGS. 6A-6E show calculated performances of a system for generating squeezed light via four-wave mixing, according to an embodiment. The system is similar to the apparatus 100 shown in FIG. 1 and has realistic device parameters that can be readily achievable in modern silicon nitride microring resonators. In this system, the drive light beam has a power of about 200 mW at the phase-matching point, i.e., the net detuning associated with the multi-resonant four-wave mixing process is zero, or $\Delta_{net}=0$. The round trip length of the main resonator is about 400 μm, the frequency of the signal light beam $\omega_S$ is about $2\pi \times 193$ THz, the nonlinear parameter $\gamma_{NL}$ is about 1 $(Wm)^{-1}$, and the group velocity $v_g$ is about $c/1.7$. The intrinsic quality factor is $2\times 10^6$ for all three resonances with escape efficiencies of 0.5 (critically coupled) for the drive mode D, 0.9 for the S mode, and 0.98 for the pump mode P. The corresponding loaded quality factors are then respectively $1\times 10^6$, $2\times 10^5$, and $4\times 10^4$. This sequence of coupling ratios can maximize the circulating power in the D mode and achieve good escape efficiency for the generated photons in the S mode. This configuration can also allow large-bandwidth pulses into the P mode, which can be beneficial for achieving low Schmidt number. Independent control over the escape efficiencies can be realized by suitable coupler design (e.g., via MZI couplers).

Figure 6A:
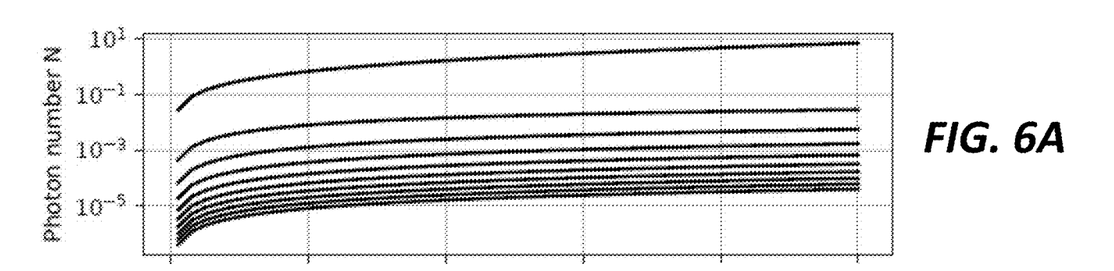
FIGS. 6A-E show calculated performances of a system for generating squeezed light via four-wave mixing, according to an embodiment.
Figure 6B:
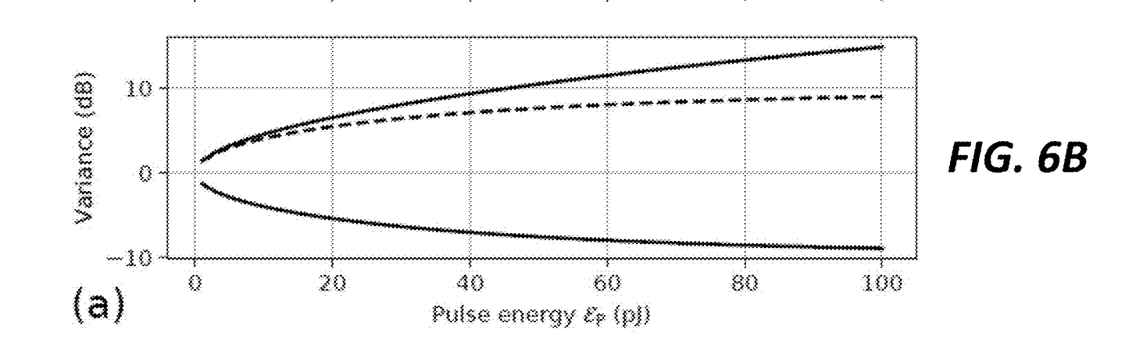

FIG. 6A shows the mean photon number of the first ten Schmidt modes as a function of pulse energy. The dominant mode (represented by the top curve) consistently lies about 100 times above the next largest mode. FIG. 6B shows variance (in dB) relative to vacuum of the squeezed quadrature (represented by the bottom solid curve) and anti-squeezed quadrature (represented by the top solid curve). As used herein, the squeezed quadrature refers to the quadrature exhibiting the lowest quadrature variance, and the anti-squeezed quadrature refers to the quadrature that exhibits the highest quadrature variance. The dashed curve shows the variance of anti-squeezed quadrature for an ideal pure state. Some excess anti-squeezing is evident from the finite escape efficiency.

Figure 6C:
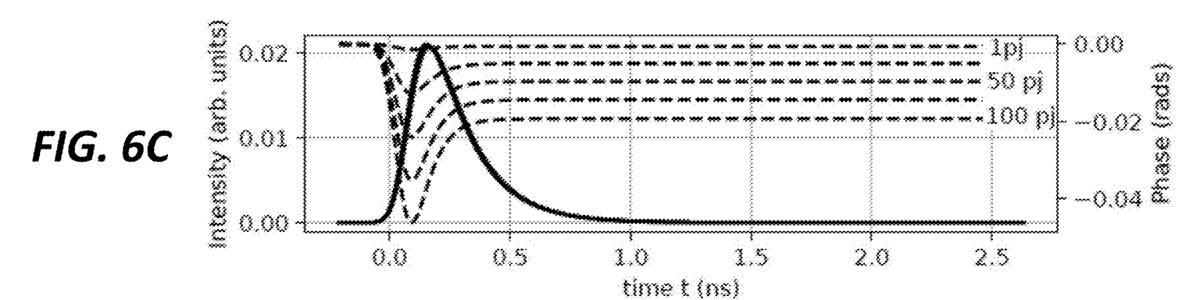

FIG. 6C shows calculated intensity (represented by the solid curves) and phase (represented by the dashed curves) of the temporal mode profile for the squeezed pulses generated for five pulse energies spanning 1 to 100 pJ. The intensity profiles are virtually unchanged across this range. The phases show only very small progressive deviations due to cross-phase modulation from the pulsed pump as the pulse energy increase, leading to very slight degradation of the fidelity between the complex pulse profile at each energy and that at the lowest energy (as shown in FIG. 6E). The Schmidt number is consistently close to unity, as shown in FIG. 6D.

One limit to squeezing attainable in the system shown in FIGS. 6A-6E arises out of the escape efficiency, which in this case limits the output to $-10 \log(1-\eta_S^{esc})=10$ dB of squeezing. $\eta^{esc}$ is the escape efficiency, i.e., the probability that a photon generated in the resonant mode escapes to the channel as opposed to being lost to scattering absorption, $\eta_S^{esc}$ refers to the escape efficiency of photons in the signal light beam (i.e., squeezed light).

As seen from FIGS. 6A and 6B, the system can readily approach loss-limited performance, with nearly 10 dB of squeezing realized for a Gaussian pump pulse having energy 100 pJ and intensity full width at half maximum duration set to one tenth of the S mode dwelling time. This level of squeezing can be sufficient for many continuous variable (CV) quantum sampling protocols, which typically use squeezed states having a mean photon number of about one.

Figure 6D:
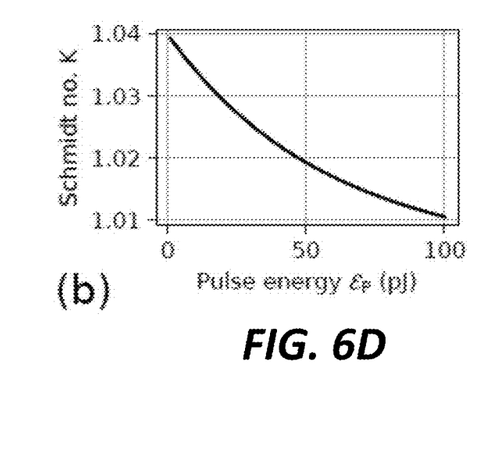
Figure 6E:
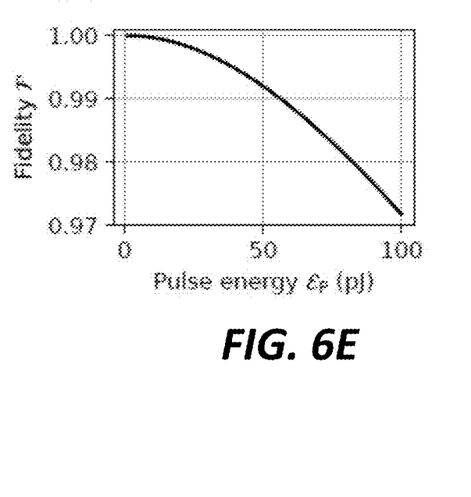

Furthermore, as shown in FIGS. 6C-6E, the system produces clean single temporal-mode squeezed pulses of roughly one ns duration, with negligible variation in their pulse profiles across a wide tuning range of squeezing levels. The Schmidt number, and the fidelity of the generated temporal mode at high input energies both remain very close to unity. For applications involving very high squeezing levels, such as metrology and CV teleportation, ultra-low loss platforms permit the escape efficiency of the signal resonance to be further optimized while maintaining acceptable efficiency. For a system with intrinsic quality factors of about $10^7$, $\eta_S^{esc}=0.99$, and $\eta_P^{esc}=0.999$, 15 dB of squeezing can realized with only a few dB of additional anti-squeezing arising from the sub-unity escape efficiency. $\eta_P^{esc}$ is the escape efficiency of the pump light beam. Accordingly, the approach described herein has considerable utility for a wide range of CV quantum information processing applications.

Figure 7:
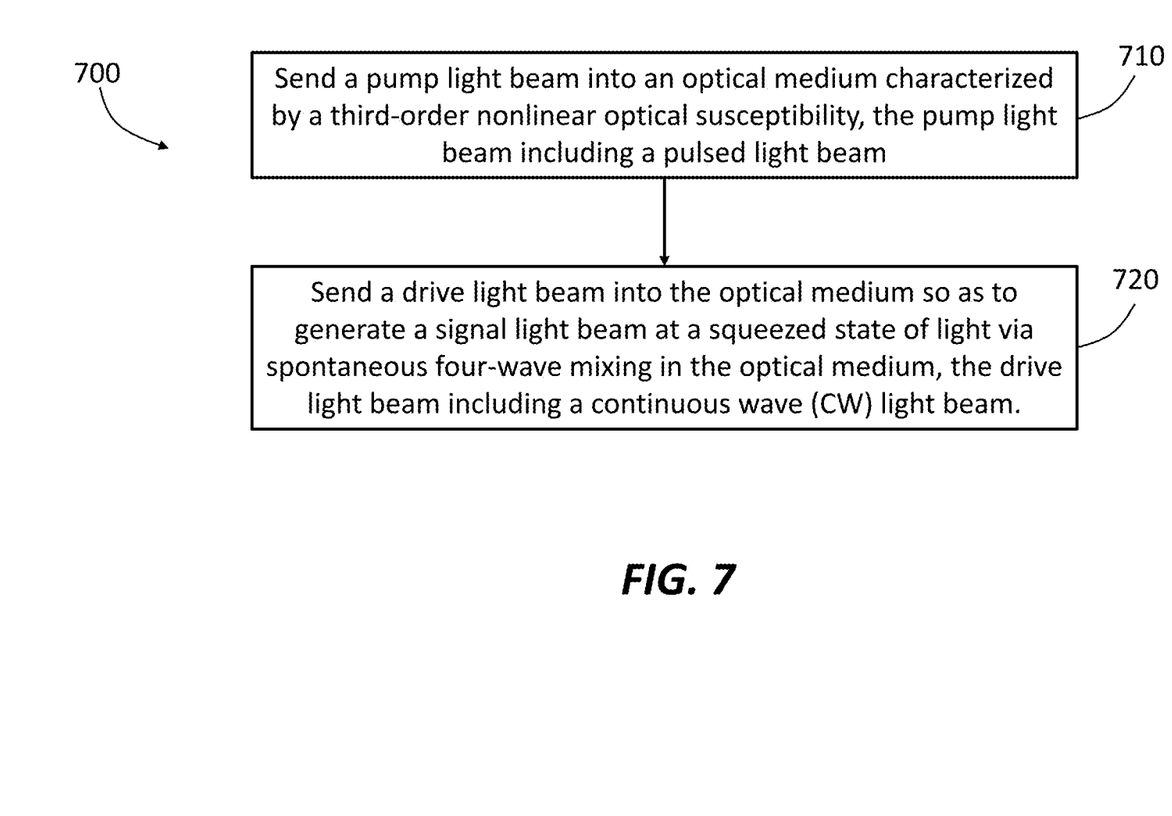
FIG. 7 shows a flowchart illustrating a method of generating squeezed light via four-wave mixing, according to an embodiment.

FIG. 7 shows a flowchart illustrating a method 700 of generating squeezed light via four wave mixing, according to an embodiment. The method includes, at 710, sending a pump light beam into an optical medium characterized by a third-order nonlinear optical susceptibility. The pump light beam includes a pulsed light beam. The method also includes, at 720, sending a drive light beam into the optical medium so as to generate a signal light beam at a squeezed state of light via spontaneous four-wave mixing in the optical medium. The drive light beam including a continuous wave (CW) light beam.

In some embodiments, the power of the drive light beam is sufficiently high so as to drive the four-wave mixing process, as well as to detune the resonant frequencies of the pump light beam and the signal light beam via cross-phase modulation. In some embodiments, the power of the drive light beam can be ten times or greater than the power of the pump light beam.

The properties of the signal light beam (also referred to as the squeezed light) can be adjusted in several ways. In some embodiments, the method 700 also includes adjusting the power of the pump light beam or the drive light beam so as to change a squeezing factor of the squeezed state of light. In some embodiments, the method 700 includes adjusting the phase of the pump light beam or the drive light beam so as to change a phase of the squeezed state of light. In some embodiments, the method 700 includes adjusting the frequency (or wavelength) of the pump light beam or the drive light beam so as to change a squeezing factor of the squeezed state of light.

In some embodiments, the optical medium includes silicon nitride that is compatible with existing optical technologies and semiconductor processing platforms. In some embodiments, the optical medium is configured as a ring resonator, and the drive light beam and the pump light beam are coupled into the ring resonator via a Mach-Zehnder interferometer (MZI). The MZI allows independent control over the coupling between the drive/pump light beam and the ring resonator.

In some embodiments, the method also includes suppressing auxiliary resonances (also referred to as unwanted resonances) in the ring resonator that includes the optical medium. Such suppression can be achieved in various approaches. In some implementations, the auxiliary resonances can be suppressed using a coupler, optically coupled to the ring resonator, to couple out photons generated by the auxiliary resonances. In some implementations, the auxiliary resonances can be suppressed using an auxiliary ring resonator optically coupled to the ring resonator where the squeezed light is generated. The auxiliary ring resonator can also effectively couple out photons generated by the auxiliary resonances.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein, a "module" can be, for example, any assembly and/or set of operatively-coupled electrical components associated with performing a specific function, and can include, for example, a memory, a processor, electrical traces, optical connectors, software (stored and executing in hardware) and/or the like.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:
    an optical medium characterized by a third-order nonlinear optical susceptibility, the optical medium including a first ring resonator;
    a pump light source in optical communication with the optical medium and configured to send a pump light beam to the optical medium, the pump light beam including a pulsed light beam;
    a drive light source in optical communication with the optical medium and configured to send a drive light beam to the optical medium, the drive light beam including a continuous wave (CW) light beam, the pump light beam and the drive light beam being configured to generate a signal light beam in a squeezed state of light via spontaneous four-wave mixing in the optical medium,
    a coupler in optical communication with the first ring resonator and configured to couple the pump light beam and the drive light beam into the first ring resonator; and
    a second ring resonator in optical communication with the first ring resonator and configured to suppress auxiliary resonance within the first ring resonator.

2. The apparatus of claim 1, wherein the optical medium includes silicon nitride.

3. The apparatus of claim 1, wherein the coupler includes:
    a Mach-Zehnder interferometer (MZI) in optical communication with the first ring resonator and configured to couple the pump light beam and the drive light beam into the first ring resonator.

4. The apparatus of claim 1, wherein coupler includes:
    a racetrack coupler in optical communication with the first ring resonator and configured to couple the pump light beam and the drive light beam into the first ring resonator.

5. The apparatus of claim 1, wherein the drive light beam is configured to drive the spontaneous four-wave mixing and detune a resonance frequency of the pump light beam and a resonance frequency of the signal light beam.

6. The apparatus of claim 1, wherein the pump light beam is configured to generate the signal light beam in a single-temporal-mode squeezed vacuum state.

7. The apparatus of claim 1, wherein a first power of the pump light beam is less than 10% of a second power of the drive light beam so as to decrease an effect of dynamical self-phase modulation and an effect of dynamical cross-phase modulation induced by the pump light beam.

8. An apparatus, comprising:
an optical medium characterized by a third-order nonlinear optical susceptibility, the optical medium including a ring resonator;
a pump light source in optical communication with the optical medium and configured to send a pump light beam to the optical medium, the pump light beam including a pulsed light beam;
a drive light source in optical communication with the optical medium and configured to send a drive light beam to the optical medium, the drive light beam including a continuous wave (CW) light beam, the pump light beam and the drive light beam being configured to generate a signal light beam in a squeezed state of light via spontaneous four-wave mixing in the optical medium;
a first coupler in optical communication with the ring resonator and configured to couple the pump light beam and the drive light beam into the ring resonator; and
a second coupler in optical communication with the ring resonator and configured to suppress auxiliary resonance within the ring resonator.

9. A method, comprising:
sending, via a coupler, a pump light beam into an optical medium characterized by a third-order nonlinear optical susceptibility, the pump light beam including a pulsed light beam and the optical medium including a first ring resonator;
coupling a drive light beam into the optical medium via the coupler to interact with the pump light beam so as to generate a signal light beam at a squeezed state of light via spontaneous four-wave mixing in the optical medium, the drive light beam including a continuous wave (CW) light beam;
suppressing auxiliary resonances within the first ring resonator using a second ring resonator disposed in optical communication with the first ring resonator.

10. The method of claim 9, further comprising:
adjusting a power of at least one of the pump light beam or the drive light beam so as to change a squeezing factor of the squeezed state of light.

11. The method of claim 9, further comprising:
adjusting a phase of at least one of the pump light beam or the drive light beam so as to change a phase of the squeezed state of light.

12. The method of claim 9, further comprising:
adjusting a frequency of at least one of the pump light beam or the drive light beam so as to change a squeezing factor of the squeezed state of light.

13. The method of claim 9, wherein sending the pump light beam includes sending the pump light beam into silicon nitride.

14. The method of claim 9, further comprising:
adjusting a first coupling between the pump light beam and the first ring resonator using a Mach-Zehnder interferometer (MZI) configured to couple the pump light beam into the first ring resonator; and
adjusting a second coupling between the drive light beam and the first ring resonator using the MZI.

15. The method of claim 9, further comprising:
adjusting a first coupling between the pump light beam and the first ring resonator using a racetrack coupler configured to couple the pump light beam into the first ring resonator; and
adjusting a second coupling between the drive light beam and the first ring resonator using the racetrack coupler.

16. The method of claim 9, wherein sending the drive light beam includes sending the drive light beam having a power to drive the spontaneous four-wave mixing within the optical medium and detune a resonance frequency of the pump light beam and a resonance frequency of the signal light beam.

17. The method of claim 9, wherein sending the pump light beam includes sending the pump beam to generate the signal light beam in a single-temporal-mode squeezed vacuum state.

18. The method of claim 9, further comprising:
decreasing a power of the pump light beam so as to decrease an effect of self-phase modulation and an effect of cross-phase modulation induced by the pump light beam.

19. A method, comprising:
sending a pump light beam into an optical medium characterized by a third-order nonlinear optical susceptibility, the pump light beam including a pulsed light beam and the optical medium including a ring resonator;
sending a drive light beam into the optical medium to interact with the pump light beam so as to generate a signal light beam at a squeezed state of light via spontaneous four-wave mixing in the optical medium, the drive light beam including a continuous wave (CW) light beam; and
suppressing auxiliary resonances within the ring resonator using an auxiliary coupler disposed in optical communication with the ring resonator.

20. A system, comprising:
a ring resonator including an optical medium characterized by a third-order nonlinear optical susceptibility;
a linear waveguide in optical communication with the ring resonator and configured to propagate a pump light beam and a drive light beam;
a first coupler in optical communication with the ring resonator and the linear waveguide and configured to couple the pump light beam and the drive light beam into the ring resonator, the drive light beam and pump light beam being configured to reduce an effect of time-varying self-phase modulation and an effect of time-varying cross-phase modulation, the pump light beam and the drive light beam being further configured to generate a signal light beam in a squeezed light of state via four-wave mixing; and
a second coupler in optical communication with the ring resonator and configured to suppress auxiliary resonances within the ring resonator.

* * * * *